3,557,010
REMOVAL OF IRON FROM HYPOCHLORITE SOLUTIONS
Michael J. Skrypa, Florham Park, N.J., and Francis R. Baran, Salina, and William W. Low, Geddes, N.Y., assignors to Allied Chemical Corporation, New York, N.Y., a corporation of New York
No Drawing. Filed Aug. 16, 1967, Ser. No. 660,922
Int. Cl. C01b 11/06
U.S. Cl. 252—187                 11 Claims

ABSTRACT OF THE DISCLOSURE

Production of hypochlorite solutions containing less than 0.1 part per million of iron which comprises adding calcium chloride and an alkali metal carbonate to said hyprochlorite solutions containing iron impurities and permitting the precipitation of calcium carbonate which results in hypochlorite solutions containing less than 0.1 part per million of iron.

REMOVAL OF IRON FROM HYPOCHLORITE SOLUTIONS

This invention relates to the removal of iron from alkali metal hypochlorite solutions; more particularly the present invention relates to the removal of iron from sodium hypochlorite bleach solutions.

In the production of sodium hypochlorite bleach from the reaction of chlorine and caustic soda a bleach results containing a relatively high iron content which upon standing precipitates from the bleach as the red, gelatinous iron hydroxide. The presence of this precipitate in a bleach sold for household use is objectionable. Accordingly, in order to obtain a hypochlorite bleach solution which has acceptable optical characteristics, it is necessary to remove the iron contamination from the bleach solution to less than about 0.1 part per million.

Many methods previously have been attempted and for one reason or another they are not commercially satisfactory. For instance, separation of the iron hydroxide precipitate by settling is objectionable because the time consumed necessary to effect complete precipitation and settling requires a holding time in the order of 72 hours, which is too costly for large scale bleach production. Also, coprecipitation with, or adsorption on, insoluble materials, such as aluminum hydroxide, magnesium oxide, silica gel, activated carbon, alumina, and colloidal pyrogenic silica pigment were tried to induce more rapid removal of the iron from the bleach. Further, lowering of the pH level of the bleach to about 9.5, to obtain conditions more suitable for precipitation of iron, by addition of carbon dioxide (Dry Ice), aluminum chloride, or chlorinating until essentially all of the excess sodium hydroxide was used up were tried to achieve more satisfactory results. While some of these methods result in good iron removal, there were concomitant disadvantages, e.g., (1) post-filtration precipitation causing turbidity to develop in the filtered bleach requiring further treatment of the bleach; (2) decomposition of the hypochlorite solution at the lowered pH level requiring the addition of more sodium hydroxide; and (3) the time required to effect the iron removal to a satisfactory level, e.g., less than 0.1 part per million, is excessive. Thus, in U.S. Pat. 2,918,351 which describes the addition of carbon dioxide to a sodium hypochlorite solution in order to precipitate metallic impurities from the solution, the patentee states that it takes from 4 to 6 hours for the impurities to settle out. Also, by lowering the pH level of he hypochlorite solution to the order of about 9.3 to 9.5 decomposition of some of the hypochlorite may result unless additional sodium hydroxide is added after the addition of the carbon dioxide in order to stabilize the hypochlorite solution.

It has now been found that hypochlorite solutions, particularly sodium hypochlorite solutions useful as bleaches, containing less than 0.1 part per million of iron and having acceptable optical characteristics may be prepared by adding calcium chloride and an alkali metal carbonate to the hypochlorite solution containing iron impurities, preferably containing up to about 3 parts per million iron, and permitting the precipitation of calcium carbonate from the hypochlorite solution and obtaining a hypochlorite solution containing less than 0.1 part per million of iron.

It is therefore an object of the present invention to produce an alkali metal hypochlorite solution having a low iron content.

It is another object of this invention to treat sodium hypochlorite solution so that is not any post-filtration precipitation.

It is a further object of this invention to precipitate the iron impurities from a sodium hypochlorite solution in a very short time.

It is an additional object of this invention to precipitate out iron from a sodium hypochlorite solution by an economical and safe method without decomposition of the hypochlorite.

In accordance with the present invention an aqueous sodium hypochlorite solution containing iron impurities is treated with a sufficient amount of calcium chloride and at least about the stoichiometric amount, preferably an excess of about 0.05 to 0.5% by weight of the bleach, of an alkali metal carbonate necessary to react with the calcium chloride, to precipitate calcium carbonate carrying with it the iron impurities to produce an optically acceptable sodium hypochlorite solution containing less than 0.1 part per million of iron and which does not exhibit any post-settling precipitation. In the event a bleach is prepared which already contains about one percent by weight of an alkali metal carbonate, e.g., a bleach prepared using tail gas chlorine to chlorinate a caustic soda solution, it is not necessary to add additional alkali metal carbonate before treating the bleach as long as there is present at least about the stoichiometric amount required to react with the calcium chloride.

Any sodium hypochlorite solution may be treated according to the practice of the present invention. In practice, however, the sodium hypochlorite concentration in commercial bleaches usually varies from about 5 to 15%, with dilute bleaches containing about 5.5% NaOCl and concentrated bleaches containing about 15% NaOCl. Generally, these bleaches are prepared by passing chlorine into a caustic soda solution for a sufficient period of time under chlorination conditions, e.g., a temperature within the range of about 15° to 20° C., until only a small amount of excess caustic remains, generally less than 1% by weight, preferably less than 0.1% by weight. For most effective iron removal, the caustic concentration of the bleach at the time of treatment for iron removal should be in the order of about 0.01 up to about 0.07%. The desired concentration of NaOCl may be obtained by diluting the concentrated bleach with water.

The amount of calcium chloride employed generally is that amount which is necessary to form a precipitate of calcium carbonate when reacted with the alkali metal carbonate and reduce the iron content below about 0.1, preferably 0.05, part per million. It has been found that as little as about 0.01%, preferably 0.05%, by weight of calcium chloride can be effectively employed to precipitate a sufficient amount of calcium carbonate to reduce the iron level in the bleach to less than 0.1 part per million in a relatively short time. The upper limit is dictated on the basis of economics rather than effectiveness. However, as a practical upper limit 1.0% by weight, preferably about 0.5%, with an especially preferred upper limit of 0.3%, calcium chloride is employed. The calcium chloride is preferably added in the form of an aqueous solution containing from about 3.5% to about 20% by weight calcium chloride. This is the preferred form for adding the calcium chloride since solid calcium chloride might not dissolve completely in the hypochlorite solution, which preferably contains at least about a stoichiometric equivalent amount of an alkali metal carbonate necessary to combine with the calcium chloride employed, due to the formation of an insoluble layer of calcium carbonate on the calcium chloride particle. The alkali metal carbonate, if not already present in the bleach as prepared, may be added to the hypochlorite solution either in powder form or in the form of an aqueous solution. In the preferred method of the present invention sodium carbonate is first added to an agitated hypochlorite solution and then the calcium chloride solution is added.

Employing vigorous agitation permits the rapid addition of the calcium chloride solution (single one-shot addition). If moderate agitation is to be employed a gradual addition of the calcium chloride solution has been found to be more effective than the single one-shot addition of the calcium chloride in reducing the iron content below the desired level. Stirring of the hypochlorite solution during the addition of the sodium carbonate and calcium chloride is necessary to achieve the most efficient reduction of the iron content in the hypochlorite solution. However, stirring after the calcium chloride addition during the settling period was found to have no effect on precipitation formation. Alternatively, the sodium carbonate and calcium chloride solution could be added simultaneously, preferably maintaining a slight excess of sodium carbonate. Also, the sodium carbonate and calcium chloride solution could be added in alternative incremental portions, e.g., sodium carbonate, calcium chloride, sodium carbonate, etc.

In the prior art methods, the time within which the metallic impurities, including iron, were precipitated out of the hypochlorite solution generally exceeds a period of about four hours. In the present invention it has been found that the calcium carbonate, carrying essentially all the metallic impurities, completely precipitates out of the hypochlorite solution generally in about 0.5 hour, advantageously in 1–4 hours, with 1–2 hours being most effective. In most cases it was found that the calcium carbonate and the iron impurities had precipitated out of the hypochlorite solution in two hours or less, resulting in a residual iron content in the hypochlorite solution of less than 0.1, preferably less than .05, part per million. Precipitation times of less than 1 hour are not preferred because even though the iron content of the hypochlorite solution is reduced below a permissible level, a post-settling precipitate occurs. Thus, for most effective treatment of a sodium hypochlorite solution a period of one hour precipitation time is employed to reduce the iron content to below 0.1, preferably below about 0.05, part per million without any post-settling precipitation problems.

A number of examples are given below as an illustration of the method of the present invention. It is understood that the present invention is not limited to these examples.

EXAMPLE I—PREPARATION OF SODIUM HYPOCHLORITE

About 2700 ml. of caustic soda solution prepared by diluting 50% mercury cell caustic soda to 14% with water was poured into a 4-liter beaker equipped with a glass cooling coil and a propeller stirrer. The stirred solution was cooled to a temperature of 15–20° C. before the addition of any chlorine.

The chlorine was introduced through a glass sparger with the apparatus set up to introduce liquid chlorine into the sparger. Essentially all of the chlorine was vaporized in the sparger before passing into the caustic soda solution.

The temperature was maintained below 20° C. and chlorination was continued until an excess of up to 0.15% caustic remained. The sodium hypochlorite solution contained about 13% by weight NaOCl. Dilute solutions are prepared by mixing the concentrated bleach with water to the desired concentration.

EXAMPLE II

A series of 13% NaOCl bleaches prepared by the method of Example I from (a) deionized water and mercury cell caustic soda containing about 2.1 p.p.m. iron and (b) diaphragm cell caustic soda and lake water containing about 2.0 p.p.m. iron were treated as follows:

(A) Filtered through Whatman No. 54 filter paper immediately after the preparation of the bleach;

(B) Mixed 1500 ml. of bleach with the following adsorbing agents "Cabosil" (a colloidal pyrogenic silica pigment), silica gel, activated carbon and activated alumina, followed by filtration after the treatment period.

(C) 1500 ml. of bleach was treated with aluminum chloride by sprinkling aluminum chloride powder slowly into 1500 ml. of bleach containing enough excess sodium hydroxide to convert the $AlCl_3$ to $Al(OH)_3$ while maintaining the excess alkalinity necessary to prevent rapid bleach decomposition. Where aluminum chloride was used to lower the pH it was added to the bleach until the pH was 9.4. Then the pH was raised to about 12 and the bleach was allowed to stand for 4 hours before filtration.

(D) The addition of magnesium oxide to the 1500 ml. of the bleach was made by sprinkling the powdered material into a stirred bleach containing enough sodium carbonate to convert all of the MgO to $MgCO_3$. Stirring was continued during the treatment period, followed by filtration.

(E) The addition of Dry Ice was carried out by slowly adding crushed Dry Ice to 1500 ml. of bleach till the pH reached 9.3. The bleach was allowed to remain at that pH for 20 minutes before the pH was raised to 11.2 by NaOH addition. After 3 hours settling time the bleach was filtered.

(F) 1500 ml. of the bleach was chlorinated to around pH 9.4 followed by a 10-minute standing period, after which the pH was adjusted to 11.6–11.7 and allowed to stand undisturbed for the remainder of the treatment time and filtered.

After each of the above treatments the concentration of the iron in the bleach was determined. These data appear in Table I below.

TABLE I.—IRON REMOVAL FROM 13% SODIUM HYPOCHLORITE BLEACH

| Treatment | Additive and/or treatment of bleach | Weight percent of additive | Fe content, p.p.m. | Time of Ppt. to develop, days | Days of last observation no Ppt. | Nature of precipitate |
|---|---|---|---|---|---|---|
| A | Not filtered [1] | | 2.1 | 1-2 | | Fine red gel. |
|   | Filtered | | 1.2 | 2 | | Do. |
|   | Not filtered [2] | | 2.0 | 1 | | Large amount—white. |
|   | Filtered | | 0.2 | 1-2 | | Small amount—fine, white. |
| B | Cabosil | 0.14 | 0.2 | 3 | | Very turbid white suspension. |
|   | Activated carbon | 0.28 | [3] | [3] | [3] | |
|   | Activated alumina | 0.28 | 0.05 | 3 | | Fine, white. |
|   | Silica gel | 0.56 | | 3 | | Do. |
| C | AlCl₃ to pH 9.4 | | <0.05 | 3 | | Small amount—fine, white. |
|   | AlCl₃ to pH 9.4 (plus NaOH to give Al(OH)₃) | 0.14 | 0.2 | 3 | | Do. |
| D | MgO plus Na₂CO₃ | 0.14 | 0.11 | <13 | | Fine, white. |
| E | Dry Ice—to pH 9.3 | | 0.05 | 1 | | Small amount—red gel. |
| F | Chlorination to pH 9.2: | | | | | |
|   | Filtered | | 0.9 | 1 | | Red gel. |
|   | Not filtered | | | 1 | | Do. |
|   | Chlorination to pH 9.4: | | | | | |
|   | Filtered | | | 1 | | Do. |
|   | Not filtered | | | 1 | | Do. |
|   | Chlorination to pH 9.5 Na₂CO₃ present. | 0.28 | 1.3 | 1 | | Fine, white. |

[1] Bleach prepared from mercury cell caustic soda and deionized water;
[2] Bleach prepared from diaphragm cell caustic soda and Skaneateles Lake water having an iron content of less than 0.03 p.p.m.;
[3] Bleach decomposed during treatment.

As can be readily seen from these data a 13% NaOCl bleach treated as above and filtered is reduced in iron content. However, further precipitation of iron occurs in a relatively short storage time. Furthermore, the iron level in most cases, while reduced, is still higher than desired for a commercially accepted bleach.

EXAMPLE III

This example demonstrates that treatment of a sodium hypochlorite bleach with sodium carbonate and calcium chloride not only reduces the iron content significantly, but prevents any post-filtration precipitation.

The sodium hypochlorite bleach was that prepared in Example I, and contained 13% NaOCl. The calcium chloride was added in the form of a dilute aqueous solution containing approximately 3.5–20 wt. percent $CaCl_2$ and which was prepared by dissolving the desired amount of calcium chloride in 20 ml. of water. This solution was then poured into approximately 1500 ml. of the bleach. The sodium carbonate previously had been added to the bleach as a powder and dissolved. The treated bleach solution was separated from the precipitate of calcium carbonate by filtration. The treated bleach was analyzed for its iron content after which it was allowed to stand for observation of the formation of any precipitate. These data are presented in Table II below.

It can be readily seen from these data that not only is the iron content of the bleach reduce to below acceptable levels, but there is also no post-precipitation for the days the treated bleach was observed. Further, these data demonstrate that it is preferred to maintain the sodium hydroxide content in the bleach below about 0.07% by weight to achieve the most effective removal of iron.

EXAMPLE IV

This series of runs demonstrate that treatment time of one hour is preferred and any longer time does not result in any obvious advantages.

In these test approximately 1500 ml. of bleach, prepared as in Example I, was placed in a 4-liter beaker and stirred with a magnetic stirrer. The desired amount of calcium chloride was dissolved in 20 ml. of deionized water to prepare an aqueous solution containing about 3.5 to 20% by weight calcium chloride. Sodium carbonate, in an amount required to convert the calcium chloride to calcium carbonate was dissolved in the bleach. The calcium chloride solution was then dripped into the bleach containing the sodium carbonate over a period of about two minutes while the bleach was being stirred. Stirring was continued during the entire treatment period. Samples were withdrawn and filtered at the times indicated. After the treatment period the bleach solution samples were

TABLE II

| Additive | Weight percent of additive | Weight percent NaOH in bleach at time of Treatment | Analyzed Fe content, p.p.m. | Days observed without any formation of precipitate |
|---|---|---|---|---|
| CaCl₂ plus NaCO₃ | [1] 0.28 | | <0.05 | 6 |
| Same as above | [1] 0.28 | | <0.05 | 7 |
| Do | [1] 0.28 | | <0.05 | 13 |
| Do | [1] 0.28 | | <0.05 | 40 |
| Do | [1] 0.28 | | 0.06 | 41 |
| Do | [1] 0.06 | 0.015 | <0.05 | |
| Do | [1] 0.06 | 0.073 | 0.10 | |
| Do | [2] 0.06 | 0.015 | <0.05 | |
| Do | [2] 0.06 | 0.073 | 0.12 | |

[1] Weight percent of additive reflects only the amount of CaCl₂ added (calculated on basis of 100% CaCl₂). The sodium carbonate was added in an amount calculated to combine exactly with the calcium chloride added.
[2] Same as [1] above except that the sodium carbonate added was in excess of the stoichiometric quantity by about 0.34 weight percent based on the weight of the solution.

filtered and the iron content determined. These data are presented in Table III, below.

TABLE III

| Treatment time | Batch | Amount of [1] CaCl$_2$, weight percent | Fe, p.p.m. | Days standing without formation of precipitate |
|---|---|---|---|---|
| 20 minutes | 32 | 0.14 | 0.10 | (²) |
| Do | 32 | 0.28 | <0.05 | (²) |
| 1 hour | 38 | 0.14 | <0.05 | 34 |
| 2 hours | 38 | 0.14 | <0.05 | 34 |
| 3 hours | 38 | 0.14 | <0.05 | 34 |
| 4 hours | 38 | 0.14 | <0.05 | 34 |
| 1 hour | 38 | 0.28 | <0.05 | 34 |
| 2 hours | 38 | 0.28 | <0.05 | 34 |
| 3 hours | 38 | 0.28 | <0.05 | 34 |
| 4 hours | 38 | 0.28 | <0.05 | 34 |

[1] Weight percent of calcium chloride reflects only the amount of CaCl$_2$ added (calculated on basis of 100% CaCl$_2$). The sodium carbonate was added in an amount calculated to combine exactly with the calcium chloride added.
[2] Precipitated 4th day.

These data demonstrate that a treatment time of one hour produces acceptable results. Treatment times of 20 minutes produced a filtered bleach which showed a small amount of fine white precipitate after a relatively short time.

EXAMPLE V

This example demonstrates various concentration levels at which the calcium chloride-sodium carbonate was effective in reducing the concentration of iron in the bleach to acceptable levels without any post-precipitation. The procedure of Example IV was followed. The resultant data obtained appear in Table IV, below.

TABLE IV

| Amount of CaCl$_2$ [1] | Fe content (p.p.m.)— Indicated treatment time | | | |
|---|---|---|---|---|
| | 1 hour | 2 hours | 3 hours | 4 hours |
| 0.06 | <0.05 | <0.05 | <0.05 | <0.05 |
| 0.08 | <0.05 | <0.05 | <0.05 | <0.05 |
| 0.14 | <0.05 | <0.05 | <0.05 | <0.05 |
| 0.28 | <0.05 | <0.05 | <0.05 | <0.05 |

[1] Weight percent of calcium chloride reflects only the amount of CaCl$_2$ added (calculated on basis of 100% CaCl$_2$). The sodium carbonate was added in an amount calculated to combine exactly with the calcium chloride added.

It may be seen from the data in Table IV that iron removal is still possible when using as little as 0.06 wt. percent calcium chloride (600 p.p.m.).

EXAMPLE VI

Dilute bleach solutions containing approximately 5.5% sodium hypochlorite were prepared by diluting a concentrated bleach solution (13% NaOCl) with water. A series of dilute bleach batches containing about 1500 ml. were treated with various amounts of calcium chloride and sodium carbonate as in previous examples. The results of these runs are listed in Table V, below.

TABLE V

| Amount of CaCl$_2$ [1] | Fe content, p.p.m. | Treatment time, hours |
|---|---|---|
| 0.05 | <0.05 | 1 |
| 0.05 | <0.05 | 2 |
| 0.09 | 0.06 | 2 |
| 0.19 | <0.05 | 2 |

[1] The weight percent of calcium chloride reflects only the amount of CaCl$_2$ added (calculated on the basis of 100% CaCl$_2$). The sodium carbonate was added in an amount calculated to combine exactly with th calcium chloride added.

Although certain preferred embodiments of the invention have been disclosed for purpose of illustration, it will be evident that various changes and modifications may be made therein without departing from the scope and spirit of the invention.

We claim:

1. A process for the treatment of an aqueous alkali metal hypochlorite solution which contains iron impurities comprising the steps of contacting said hypochlorite solution with calcium chloride and an alkali metal carbonate to effect precipitation of calcium carbonate, whereby said precipitate carries with it the iron impurities, and recovering the treated hypochlorite solution containing less than 0.1 part per million of said iron impurities.

2. The process of claim 1 wherein the calcium chloride is added to the hypochlorite solution in an amount within the range of about 0.01% to 1.0% by weight of said solution.

3. The process of claim 2 wherein the calcium chloride is added in an amount from about 0.05% to 0.5% by weight of said solution.

4. The process of claim 1 wherein the hypochlorite solution is sodium hypochlorite and the sodium carbonate is added to said hypochlorite solution in an amount which is at least stoichiometrically equivalent to react with the calcium chloride to form calcium carbonate.

5. The process of claim 4 wherein the sodium carbonate is added to the sodium hypochlorite solution in an amount that is 0.05–0.5% by weight of the solution in excess of that which is stoichiometrically equivalent to react with the calcium chloride to form calcium carbonate.

6. The process of claim 1 in which said calcium chloride is added in the form of an aqueous solution to said hypochlorite solution.

7. The process of claim 1 in which the hypochlorite solution contains less than about 0.1% by weight sodium hydroxide.

8. The process of claim 7 in which said hypochlorite solution contains about 0.015–0.07% by weight sodium hydroxide.

9. The process of claim 1 in which the hypochlorite solution is in contact with the sodium carbonate and calcium chloride for a period of at least about 0.5 hour in which time a calcium carbonate precipitate forms resulting in said solution containing less than 0.1 part per million iron.

10. The process of claim 9 in which the hypochlorite solution is in contact with the sodium carbonate and calcium chloride for a period of 1 hour or more.

11. The process of claim 1 wherein the hypochlorite solution contains about 0.2 to about 3 parts per million of iron prior to contact with the calcium chloride and sodium carbonate and less than 0.05 part per million of iron subsequent to the precipitation of calcium carbonate.

References Cited

UNITED STATES PATENTS 2,829,110    4/1958    Robson _____ 252—187
2,918,351   12/1959    Barton _____ 23—86

OTHER REFERENCES

Cotton et al.: Advanced Inorganic Chemistry, A Comprehensive Test, second edition, Interscience Publishers, 1966, pp. 858 and 859.

RICHARD D. LOVERING, Primary Examiner

I. GLUCK, Assistant Examiner

U.S. Cl. X.R.

8—108; 23—86; 252—95